US012391315B2

(12) United States Patent
Kim et al.

(10) Patent No.: US 12,391,315 B2
(45) Date of Patent: Aug. 19, 2025

(54) CENTER PILLAR FOR VEHICLE WITH IMPROVED STIFFNESS

(71) Applicants: Hyundai Motor Company, Seoul (KR); Kia Corporation, Seoul (KR)

(72) Inventors: Sang-Cheon Kim, Seoul (KR); Hyun-Jun Park, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 354 days.

(21) Appl. No.: 18/070,094

(22) Filed: Nov. 28, 2022

(65) Prior Publication Data

US 2023/0406413 A1 Dec. 21, 2023

(30) Foreign Application Priority Data

Jun. 20, 2022 (KR) ........................ 10-2022/0075024

(51) Int. Cl.

| | |
|---|---|
| ***B62D 25/04*** | (2006.01) |
| ***B60R 22/24*** | (2006.01) |
| ***B62D 21/15*** | (2006.01) |
| ***B62D 25/02*** | (2006.01) |
| ***B62D 25/06*** | (2006.01) |
| ***B62D 27/02*** | (2006.01) |

(52) U.S. Cl.

CPC .............. *B62D 25/04* (2013.01); *B60R 22/24* (2013.01); *B62D 21/157* (2013.01); *B62D 25/025* (2013.01); *B62D 25/06* (2013.01); *B62D 27/023* (2013.01)

(58) Field of Classification Search

CPC ...... B62D 25/04; B62D 25/025; B62D 25/06; B62D 21/157; B62D 27/023

USPC ....... 296/193.06, 209, 210, 23.01, 3, 187.12

See application file for complete search history.

(56) References Cited

FOREIGN PATENT DOCUMENTS

| | | | | |
|---|---|---|---|---|
| CN | 112896324 A * | 6/2021 | ............. | B62D 25/04 |
| DE | 102019216526 A1 * | 10/2020 | ............. | B60R 22/24 |
| JP | 2021091311 A * | 6/2021 | | |
| KR | 10-2007-0063337 A | 6/2007 | | |

OTHER PUBLICATIONS

CN112896324 Text (Year: 2021).*
DE102019216526 Text (Year: 2020).*
JP202191311 Text (Year: 2021).*

* cited by examiner

*Primary Examiner* — Dennis H Pedder

(74) *Attorney, Agent, or Firm* — MORGAN, LEWIS & BOCKIUS LLP

(57) ABSTRACT

A center pillar for a vehicle with improved stiffness, which has a sufficient stiffness in the event of rollover or a side collision of the vehicle, includes: a center pillar internal upper including an upper portion coupled to a roof side rail internal; and a center pillar internal lower including an upper portion coupled to a lower portion of the center pillar internal upper, and a lower portion coupled to a side sill to configure a center pillar internal, in which a center pillar reinforcement internal is coupled to an external surface of the center pillar internal, and a center pillar reinforcement external is coupled to an external surface of the center pillar reinforcement internal.

19 Claims, 13 Drawing Sheets

CENTER PILLAR FOR VEHICLE WITH IMPROVED STIFFNESS

CROSS-REFERENCE TO RELATED APPLICATION

The present application claims priority to Korean Patent Application No. 10-2022-0075024, filed on Jun. 20, 2022, the entire contents of which is incorporated herein for all purposes by this reference.

BACKGROUND OF THE PRESENT DISCLOSURE

Field of the Present Disclosure

The present disclosure relates to a center pillar for a vehicle which is a structure of connecting a floor and a roof in the vehicle, and more specifically, to a center pillar for a vehicle with improved stiffness, which has sufficient stiffness in the event of the rollover or side collision of the vehicle.

Description of Related Art

In a vehicle 100 as shown in FIG. 1, a center pillar 110 has a pillar-shaped structure in which a floor and roof of the vehicle 100 are connected between a front door and a rear door.

The center pillar 110 has a lower end coupled to a side sill 130 provided at a side end of the floor, and an upper end coupled to a roof side rail 120 provided at a side end of the roof.

Describing the structure of the center pillar 110, as shown in FIG. 2, the center pillar 110 forms a structure in which a center pillar internal 111, a center pillar reinforcement external 116, and a center pillar reinforcement internal 117 are coupled to each other in a width direction L of the vehicle. The center pillar 110 maintains a shape of a passenger compartment in the event of the side collision or rollover of the vehicle, reducing injuries to passengers.

Meanwhile, a conventional door 141 has a structure in which a glass frame 143 is formed on a circumference of a door glass 142 (see FIG. 3). In the instant case, because it is possible to secure sufficient cross sections of the center pillar reinforcement external 116 and the center pillar reinforcement internal 117 in the center pillar 110 (indicated by an in FIG. 3), the center pillar 110 may have sufficient stiffness.

However, there is a problem in that when a frameless door is applied for a beautiful design, it is difficult to have the sufficient cross sections of the center pillar reinforcement external 116 and the center pillar reinforcement internal 117. The frameless door in which the glass frame is not applied to the circumference of the door glass 142 may not secure the sufficient cross section as indicated by B in FIG. 4, and thus the stiffness of the center pillar 110 is not sufficient. The frameless door 141 has a beautiful design because the glass frame is not applied above a belt line BL. However, because the glass frame is not applied and a rear end of the door glass 142 of the front door 141 is adjacent to a front end of the door glass 142 of the rear door 141, an upper portion of the center pillar 110 has a limit to increasing the cross-sectional area. Accordingly, it is difficult to secure the passenger compartment in the event of the side collision or rollover, which causes a problem of aggravating the state of the passenger in the event of the collision or rollover.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a center pillar for a vehicle with improved stiffness, which has a cross-sectional structure configured for embodying stiffness even when a cross-sectional area is reduced upwards from the center pillar while increasing the degree of freedom in design of the vehicle.

Another object of the present disclosure is to provide a center pillar for a vehicle with improved stiffness, which strengthens the coupling of a portion coupled to a roof.

To achieve the object, a center pillar for a vehicle with improved stiffness according to an exemplary embodiment of the present disclosure includes: a center pillar internal upper including an upper portion coupled to a roof side rail internal; and a center pillar internal lower including an upper portion coupled to a lower portion of the center pillar internal upper, and a lower portion coupled to a side sill to configure a center pillar internal, in which a center pillar reinforcement internal is coupled to an external surface of the center pillar internal, and a center pillar reinforcement external is coupled to an external surface of the center pillar reinforcement internal.

A lower portion of the center pillar internal upper and the upper portion of the center pillar internal lower are disposed to overlap by a predetermined length and coupled to each other.

The center pillar internal upper includes a material having a tensile strength greater than a tensile strength of the center pillar internal lower.

The center pillar internal upper includes: a coupling portion formed along a circumference of the center pillar internal upper; stiffness portions formed convexly toward a vehicle interior inside the coupling portion in a height direction of the vehicle, and formed to be spaced from each other in a longitudinal direction of the vehicle; a connection portion formed to connect the coupling portion and the stiffness portions; and a belt support fastening portion formed between the stiffness portions spaced from each other in the height direction of the vehicle.

A width of the connection portion is formed to be reduced toward an upper end portion and a lower end portion of the connection portion.

The center pillar internal lower includes: a coupling portion formed along a circumference of the center pillar internal lower; and stiffness portions formed convexly toward the vehicle interior inside the coupling portion in the height direction of the vehicle, and formed to be spaced from each other in the longitudinal direction of the vehicle.

The stiffness portions of the center pillar internal lower and the stiffness portions of the center pillar internal upper are connected to each other.

The center pillar for the vehicle with improved stiffness further includes a belt support formed in the height direction of the vehicle, and including each of upper and lower end portions thereof fastened to the belt support fastening portion.

The center pillar internal upper is further provided with a connection member and a reinforcement plate at a portion coupled to the roof side rail internal, the connection member is coupled to an internal surface of the roof side rail internal, and the reinforcement plate is coupled to external surfaces of the center pillar internal upper and the roof side rail internal.

The connection member is formed from an upper end portion of the center pillar internal upper toward a roof panel of a vehicle, and formed to have a cross section in which an unevenness is repeated in the longitudinal direction of the vehicle.

The reinforcement plate is formed downwardly from an upper end portion of the roof side rail internal by a predetermined length, and first and second end portions of the reinforcement plate are coupled to a coupling portion formed on a circumference of the center pillar internal upper.

In the reinforcement plate, an upper portion of the reinforcement plate is coupled to the connection member and the roof side rail internal.

An upper end portion of the center pillar internal upper is coupled to the connection member, the roof side rail internal, and the reinforcement plate.

In the center pillar internal upper, an upper portion of the center pillar internal upper is coupled to the roof side rail internal and the reinforcement plate at a portion spaced apart downwardly from the upper end portion of the center pillar internal upper.

The reinforcement plate is fastened to the center pillar internal upper and an upper end portion of a belt support fastened to the center pillar internal upper in the height direction of the vehicle.

The reinforcement plate is fastened to a lower end portion of a belt support fastened to the center pillar internal upper in the height direction of the vehicle.

The reinforcement plate extends in front and rear directions of the vehicle and is coupled to an internal surface of the center pillar internal upper.

A cross-sectional area of the center pillar internal upper is formed to be narrower upwards.

A portion where the lower portion of the center pillar internal upper and the upper portion of the center pillar internal lower are coupled is positioned lower than a belt line of a vehicle.

In the center pillar reinforcement inner, an upper end portion of the center pillar reinforcement internal is positioned higher than an upper end portion of the center pillar internal lower, and positioned lower than a lower end portion of a belt support fastened to the center pillar internal upper in a height direction of a vehicle.

According to the center pillar for the vehicle with improved stiffness according to an exemplary embodiment of the present disclosure including the above configuration, it is possible to have the cross section with improved stiffness using the inside of the center pillar reinforcement while increasing the degree of freedom in design, reducing the deformation of the center pillar in the event of side collision or rollover to maintain the passenger compartment.

It is possible to reduce the passenger's injury by maintaining the passenger compartment by the center pillar even in the event of accidents.

As described above, it is possible to expand the application of the frameless door as the stiffness of the center pillar is improved, and increase the degree of freedom in the side design of the vehicle.

Furthermore, it is possible to reduce the weight of the center pillar as the length of the center pillar reinforcement internal is reduced, improving fuel efficiency of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
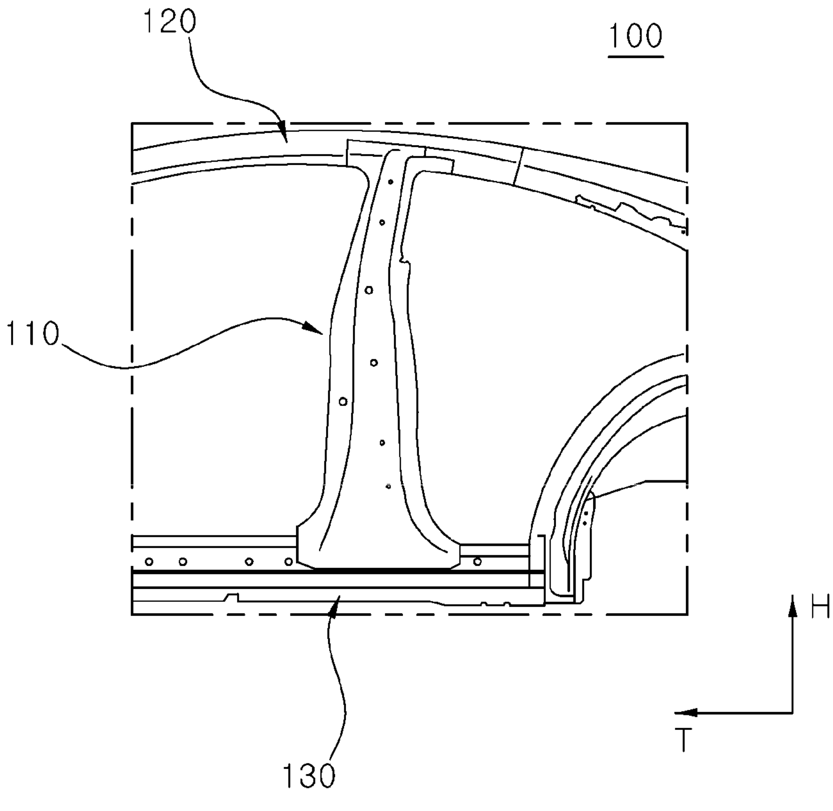
FIG. 1 is a perspective view showing a vehicle body structure of a general vehicle.
Figure 2:
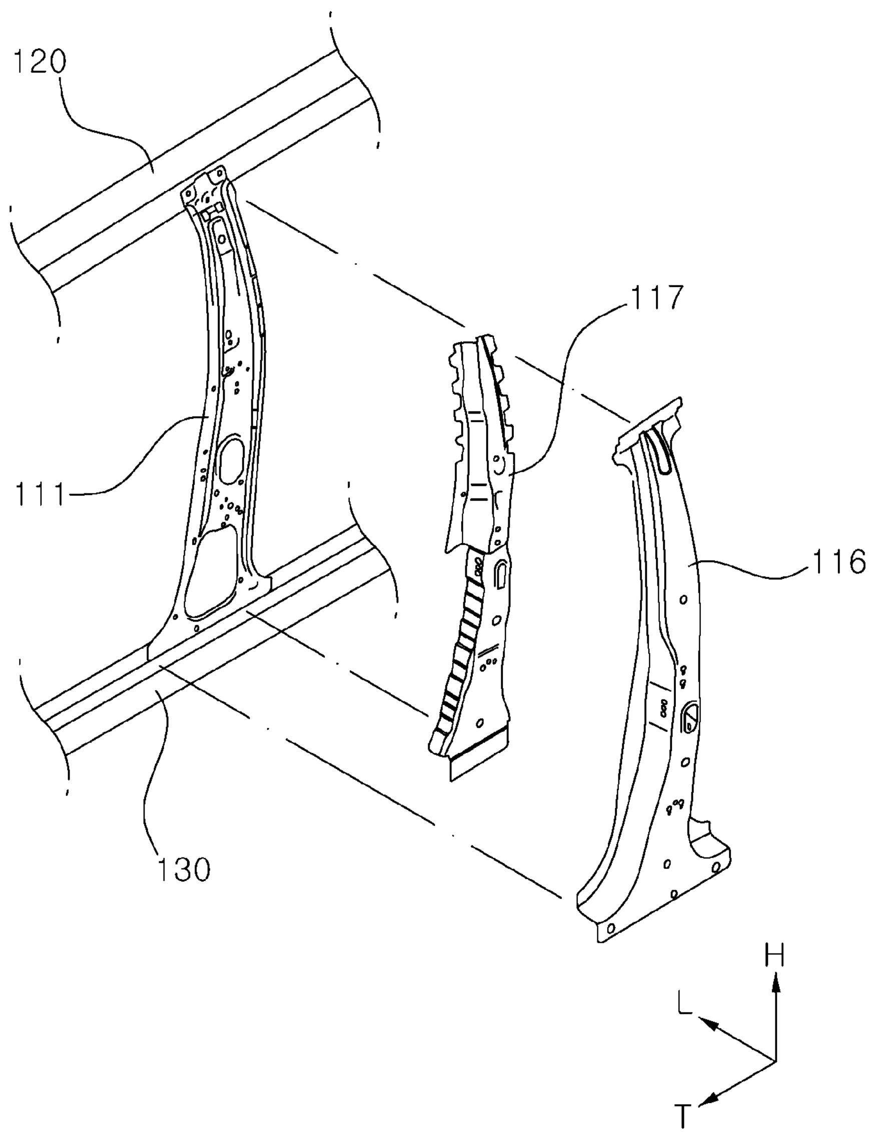
FIG. 2 is an exploded perspective view of a general center pillar.
Figure 3:
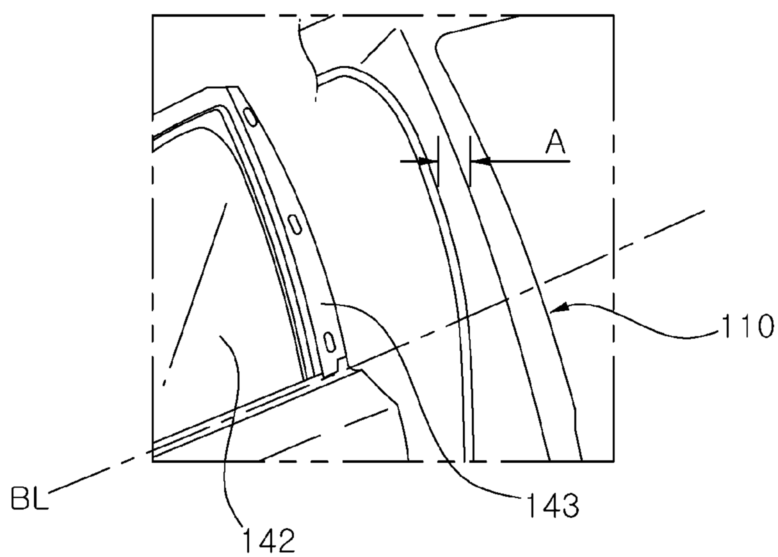
FIG. 3 is a perspective view showing a center pillar for a vehicle to which a glass frame is applied.
Figure 4:
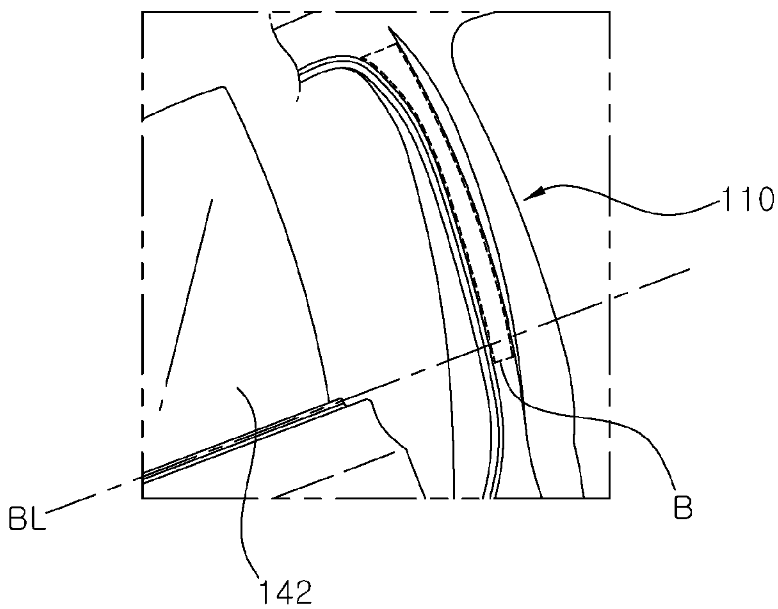
FIG. 4 is a perspective view showing a center pillar for a vehicle to which a frameless door is applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a center pillar for a vehicle with improved stiffness according to an exemplary embodiment of the present disclosure will be described in detail with reference to the accompanying drawings.

A center pillar for a vehicle with improved stiffness according to an exemplary embodiment of the present disclosure includes a center pillar internal upper 12 including an upper portion coupled to a roof side rail internal 22, and a center pillar internal lower 13 including an upper portion coupled to a lower portion of the center pillar upper 12, and including a lower portion coupled to a side sill to configure a center pillar internal 11, in which a center pillar reinforcement internal 17 is coupled to an external surface of the center pillar internal 11, and a center pillar reinforcement external 16 is coupled to an external surface of the center pillar reinforcement internal 17.

In the present disclosure, among the center pillar internal 11, center pillar reinforcement external 16, and center pillar reinforcement internal 17 configuring the center pillar 10 for the vehicle, the center pillar internal 11 is perpendicularly divided into the center pillar internal upper 12 and the center pillar internal lower 13, and the center pillar internal 11 is formed by coupling the center pillar internal upper 12 and the center pillar internal lower 13.

By dividing the center pillar internal 11 into the center pillar internal upper 12 and the center pillar internal lower 13, the center pillar internal 11 has different characteristics in the upper and lower portions. By increasing the stiffness of the center pillar internal upper 12, the center pillar 10 may have sufficient stiffness in a narrow cross-sectional area.

The center pillar internal upper 12 is formed in a predetermined length downwardly from the roof side rail internal 22 for the vehicle. The center pillar internal upper 12 has an upper end portion coupled to the roof side rail internal 22 side, and the lower end portion coupled to the center pillar internal lower 13, and the center pillar reinforcement internal 17 and the center pillar reinforcement external 16 are coupled to the outside of the center pillar internal upper 12.

The center pillar internal upper 12 includes a coupling portion 12*b* formed along a circumference of the center pillar internal upper 12, stiffness portions 12*a* formed convexly toward a vehicle interior inside the coupling portion 12*b* in a height direction of the vehicle, and formed to be spaced from each other in a longitudinal direction of the vehicle, a connection portion 12*d* formed to connect the coupling portion 12*b* and the stiffness portions 12*a*, and a belt support fastening portion 12*c* formed between the stiffness portions 12*a* spaced from each other in the height direction of the vehicle.

The coupling portion 12*b* is formed in a flange shape along the circumference of the center pillar internal upper 12 so that the center pillar internal upper 12 is coupled to other members. The center pillar internal upper 12 is bonded to other members using the coupling portion 12*b* by welding, bolting, adhesive, or the like.

The stiffness portions 12*a* are formed to have a convex cross section from the center pillar internal upper 12 toward the vehicle interior. The stiffness portions 12*a* are formed in the height direction of the vehicle in the center pillar internal 11. Furthermore, a plurality of stiffness portions 12*a* are formed to be spaced from each other in the longitudinal direction of the vehicle.

Figure 12:
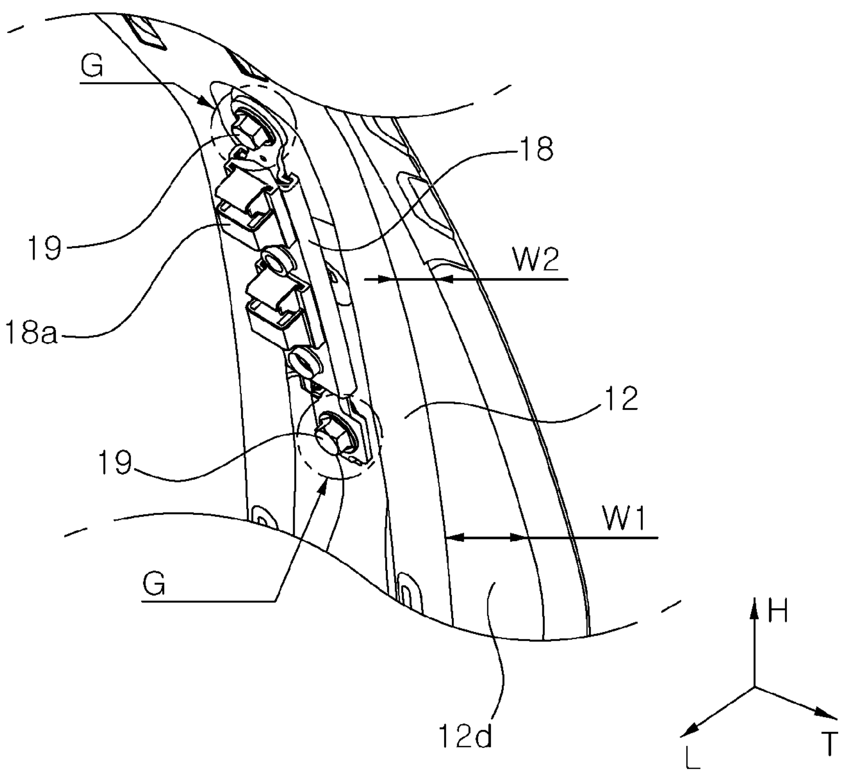
FIG. 12 is an enlarged perspective view showing portion D in FIG. 10.

The connection portion 12*d* connects the coupling portion 12*b* and the stiffness portions 12*a*. The connection portion 12*d* is a portion exposed forwards and backwards in a longitudinal direction T of the vehicle in the center pillar internal upper 12 and is formed in a plane shape. The connection portion 12*d* is formed to be narrower in width from a middle portion of the center pillar internal upper 12 toward an upper end portion and a lower end portion thereof. The connection portion 12*d* is formed to be narrower in width from the middle portion of the center pillar internal upper 12 toward the upper end portion thereof. FIG. 12 shows that a width w2 of the connection portion 12*d* at the upper portion of the center pillar internal upper 12 is narrower than a width w1 of the connection portion 12*d* at the middle portion of the center pillar internal upper 12.

The belt support fastening portion 12*c* is formed between the stiffness portions 12*a*. The belt support fastening portion 12*c* is formed to be relatively concave compared to the stiffness portions 12*a*. The belt support fastening portion 12*c* is also formed in a height direction H of the vehicle, like the stiffness portions 12*a*. A belt support 18 to which a seat belt is fastened to the belt support fastening portion 12*c*.

The center pillar internal upper 12 has the sufficient stiffness as a convex portion and a concave portion are repeatedly formed by the stiffness portions 12*a* and the belt support fastening portion 12*c* formed between the stiffness portions 12*a* toward the vehicle interior.

The center pillar internal upper 12 is formed to have a narrower cross-sectional area upwards. When the center pillar internal upper 12 is cut in a direction perpendicular to the height direction (H direction) of the vehicle, the center pillar internal upper 12 has an open cross section, but assuming that the coupling portions 12*b* are connected to each other, a cross-sectional area formed by the center pillar internal upper 12 is formed to be narrower upwards from the center pillar internal upper 12.

The center pillar internal lower 13 has an upper portion coupled to the lower portion of the center pillar internal upper 12, and a lower portion coupled to the side sill. The upper portion of the center pillar internal lower 13 is coupled with the lower portion of the center pillar internal upper 12 to form the center pillar internal 11.

The center pillar internal lower 13 includes a coupling portion 13*b* formed along a circumference of the center pillar internal lower 13, and stiffness portions 13*a* formed convexly toward the vehicle interior inside the coupling portion 13*b* in the height direction of the vehicle, and formed to be spaced from each other in the longitudinal direction of the vehicle.

Like the coupling portion 12*b* of the center pillar internal upper 12, the coupling portion 13*b* of the center pillar internal lower 13 is formed in a flange shape along the circumference of the center pillar internal lower 13 and is coupled with other members.

The stiffness portions 13*a* of the center pillar internal lower 13 are also formed to protrude convexly toward the vehicle interior. Furthermore, the stiffness portions 13*a* are formed to be spaced from each other in the longitudinal direction T of the vehicle.

The stiffness portions 13*a* of the center pillar internal lower 13 and the stiffness portions 12*a* of the center pillar internal upper 12 are connected to each other. Because the center pillar internal upper 12 and the center pillar internal lower 13 are coupled to each other to form the center pillar internal 11, the stiffness portions 12*a* and 13*a* are formed to be continuous with each other when coupled by the center pillar internal 11.

The lower portion of the center pillar internal lower 13 is coupled to a side sill 30 forming a side structure of a floor of the vehicle.

The center pillar internal upper 12 is made of a material having a tensile strength greater than a tensile strength of the center pillar internal lower 13. Because the center pillar internal upper 12 is required to support a portion where the door glass 42 is positioned in the vehicle to which the frameless door is applied, the upper portion of the center pillar internal 11 is required to have high stiffness to secure collision performance.

Because the center pillar internal upper 12 has a rapid cross-sectional change, the center pillar internal upper 12 needs to secure formability and have high tensile strength, so that a metal plate is processed by hot stamping.

The center pillar internal lower 13 is processed by rolling the metal plate as in the case of manufacturing a typical center pillar internal.

Figure 6:
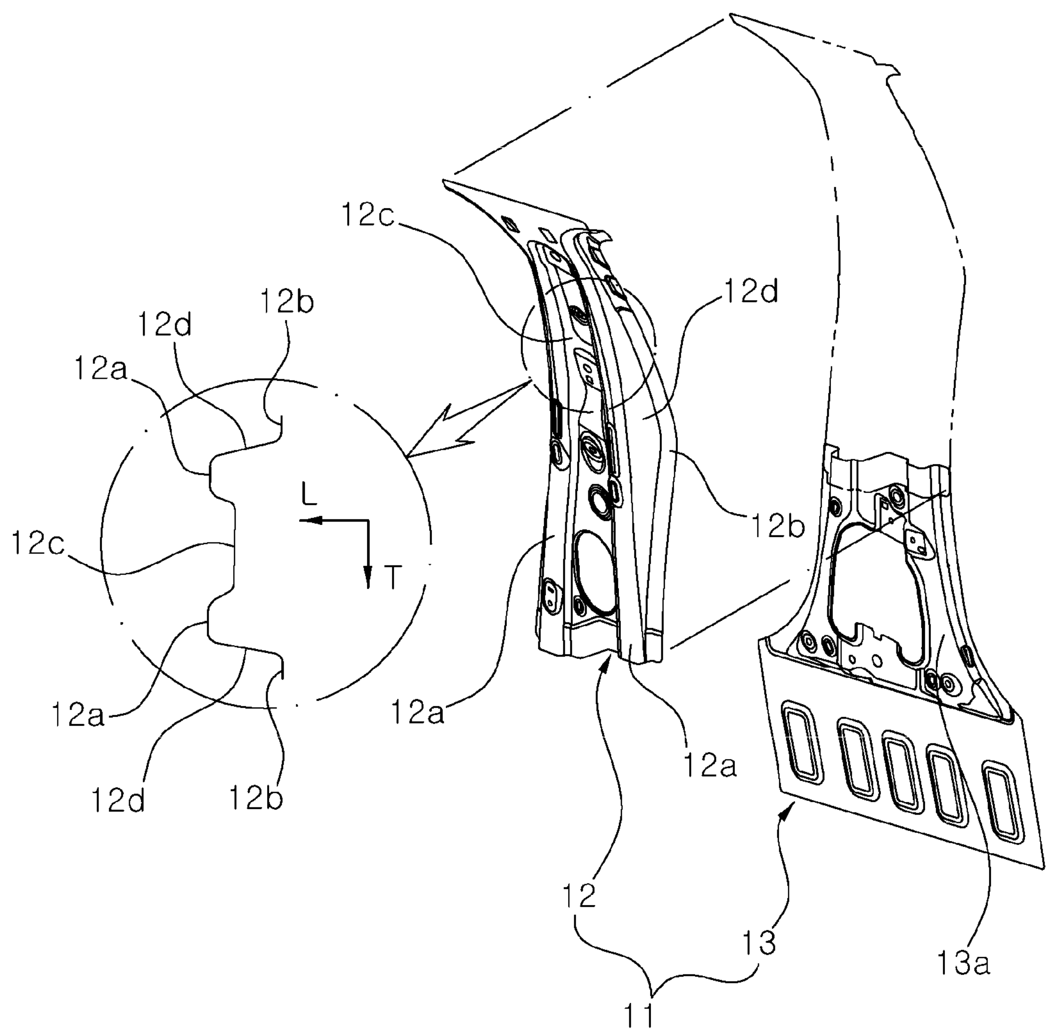
FIG. 6 is an exploded perspective view showing a center pillar internal in the center pillar for the vehicle with improved stiffness according to an exemplary embodiment of the present disclosure.
Figure 7:
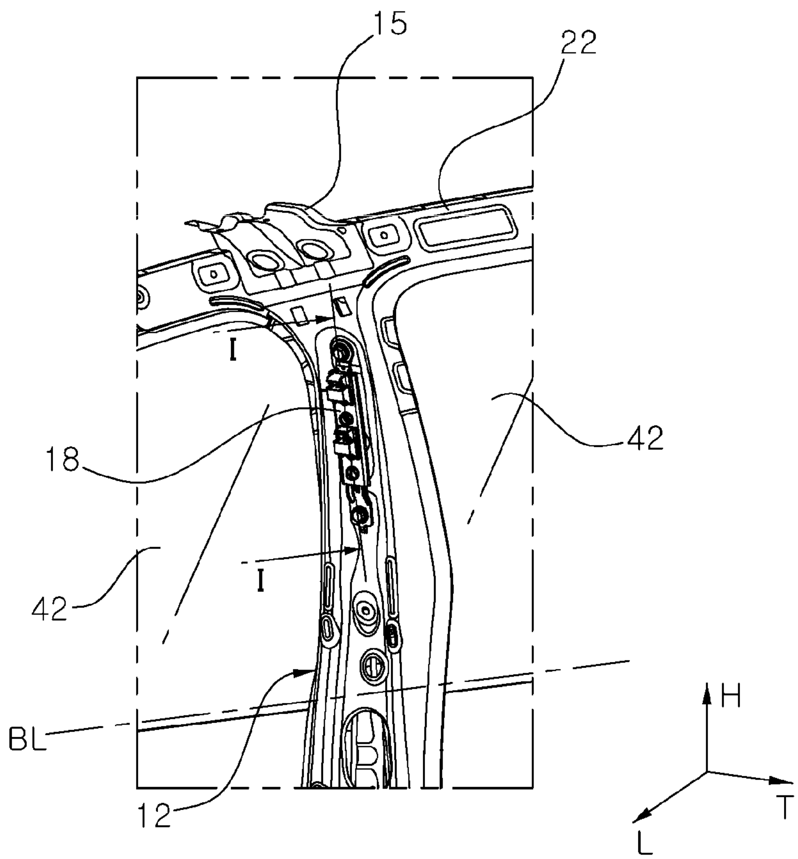
FIG. 7 is a perspective view showing the center pillar for the vehicle with improved stiffness according to an exemplary embodiment of the present disclosure.

The lower portion of the center pillar internal upper 12 and the upper portion of the center pillar internal lower 13 are disposed to overlap each other by a predetermined length and are coupled to each other to form the center pillar internal 11. FIG. 6 shows that the lower portion of the center pillar internal upper 12 and the upper portion of the center pillar internal lower 13 overlap each other by a height and are coupled to each other.

Figure 10:
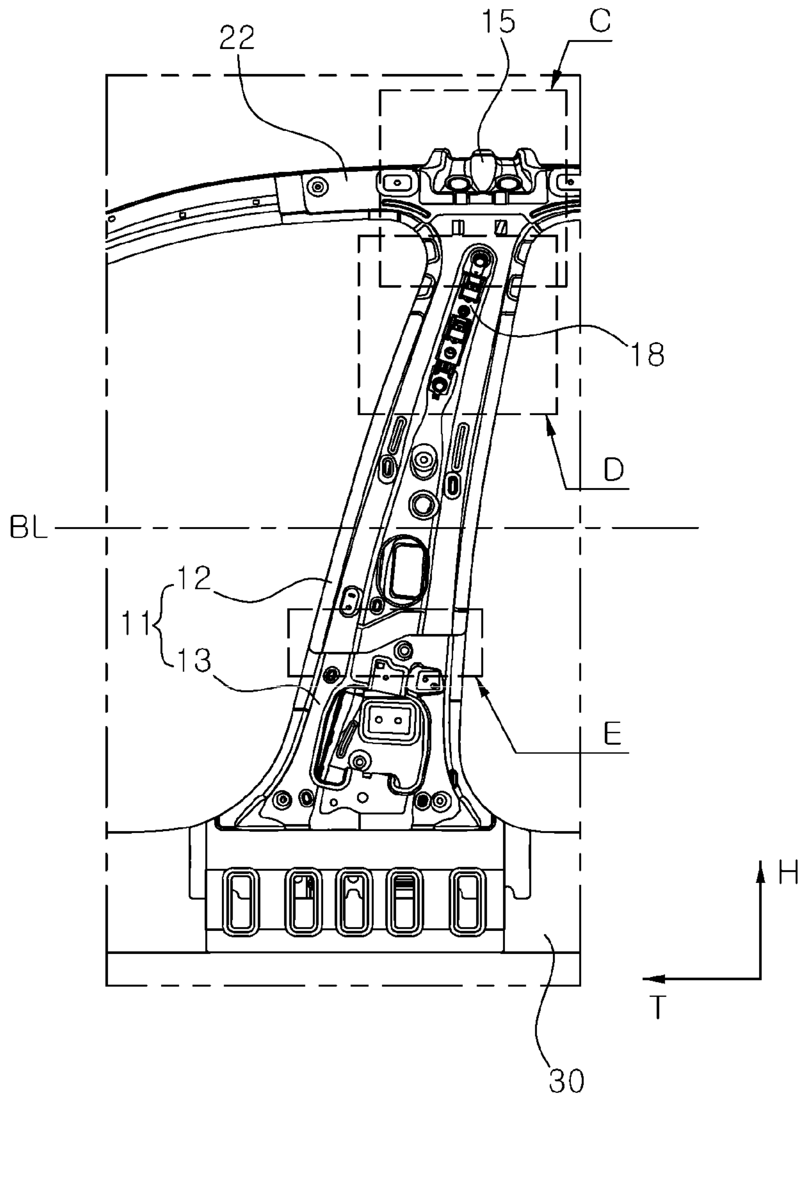
FIG. 10 is a front view showing a state in which the center pillar for the vehicle with improved stiffness according to an exemplary embodiment of the present disclosure is coupled to a roof side and a side sill.

Meanwhile, a portion where the lower portion of the center pillar internal upper 12 and the upper portion of the center pillar internal lower 13 are coupled (a portion indicated by E in FIG. 10) is positioned lower than a belt line BL of the vehicle, that is, a boundary line between the door glass 42 and the door. As described above, this is to support an upper portion of the belt line BL to which the glass frame is not applied with the center pillar internal upper 12 having high stiffness.

Figure 5:
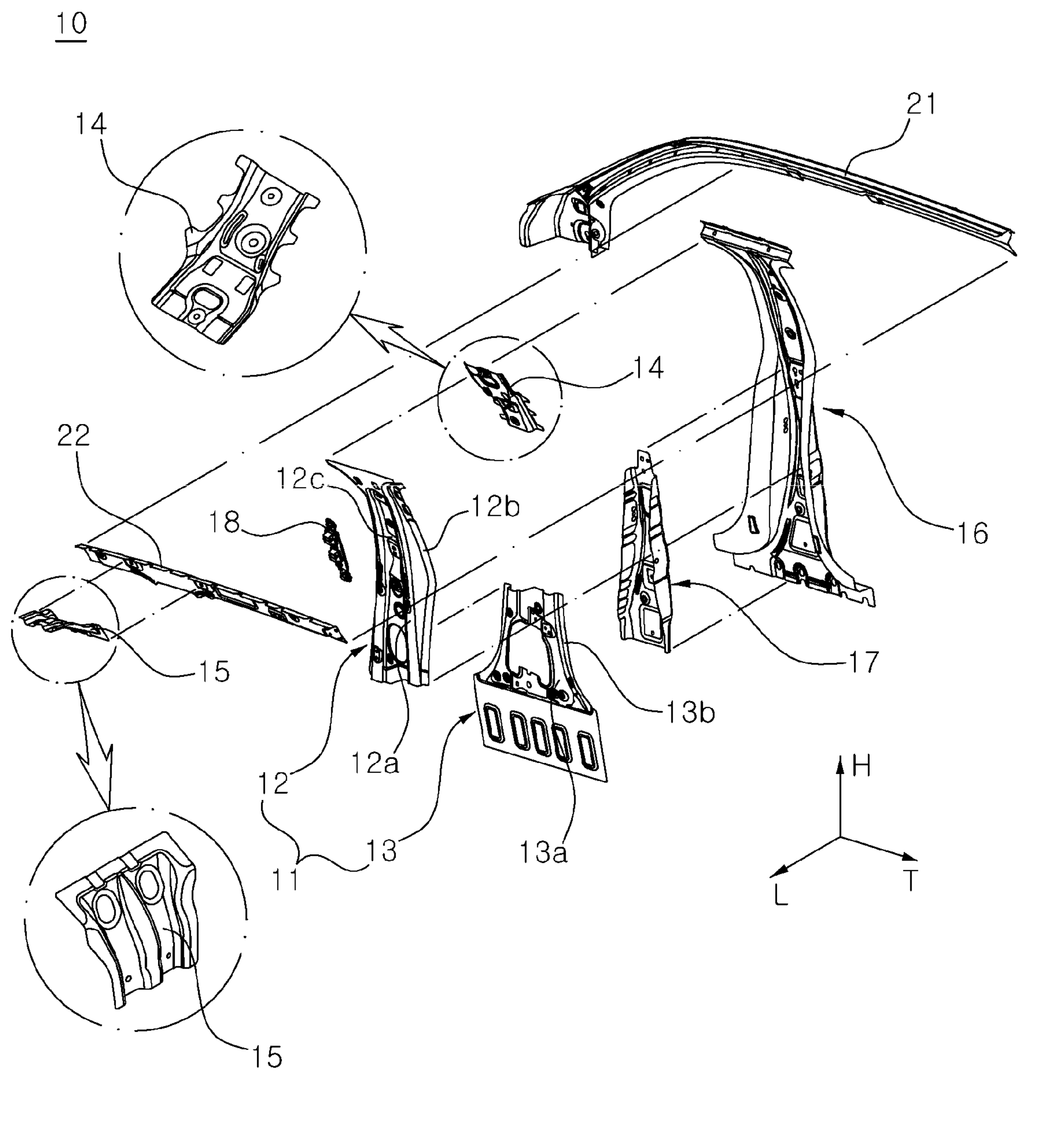
FIG. 5 is an exploded perspective view showing a center pillar for a vehicle with improved stiffness according to an exemplary embodiment of the present disclosure.

As shown in FIG. 5, the center pillar reinforcement internal 17 and the center pillar reinforcement external 16 are sequentially coupled to the outside of the center pillar internal upper 12 to which the center pillar internal upper 12 and the center pillar internal lower 13 are coupled.

Figure 9:
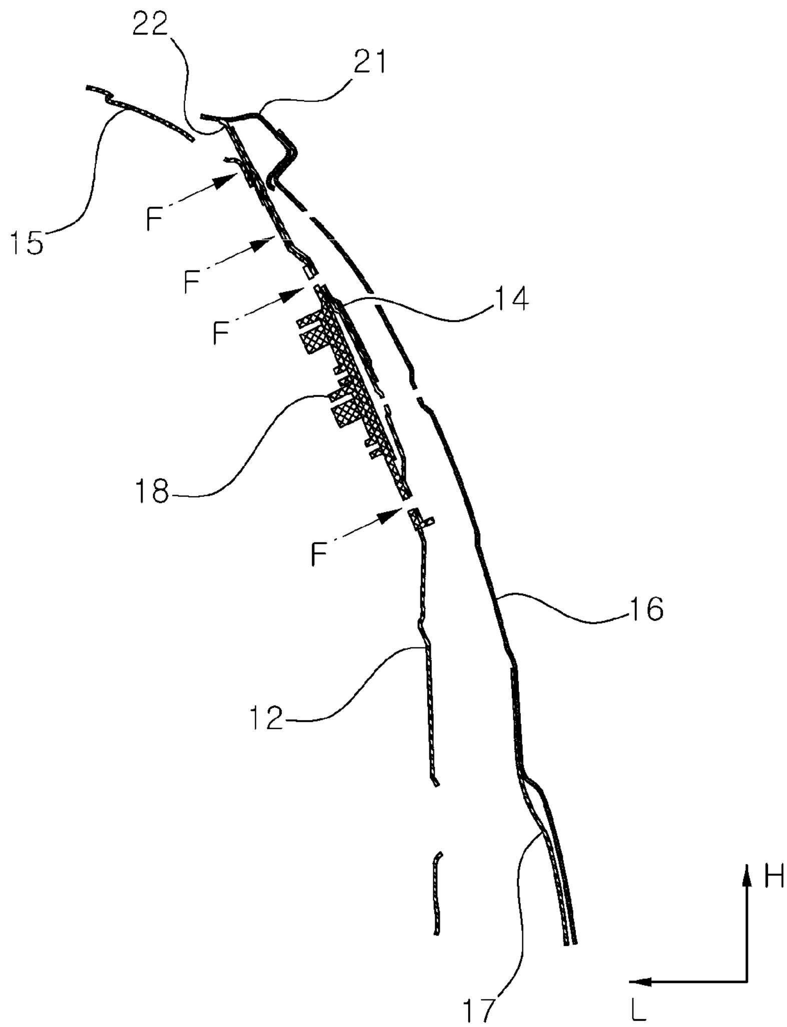
FIG. 9 is a cross-sectional view taken along line I-I in FIG. 7.

In the center pillar reinforcement internal 17, an upper end portion of the center pillar reinforcement internal 17 is positioned higher than an upper end portion of the center pillar internal lower 13, and the upper end portion of the center pillar reinforcement internal 17 is positioned lower than a lower end portion of the belt support 18 fastened to the center pillar internal upper 12 in the height direction of the vehicle. In other words, FIG. 9 shows that the upper end portion of the center pillar reinforcement internal 17 is lower than the lower end portion of the belt support 18.

Meanwhile, the center pillar reinforcement external 16 is formed to have substantially the same height as that of the center pillar internal 11. In other words, because a structure having an improved stiffness by the center pillar internal upper 12 is applied to the upper portion of the center pillar internal 11, the center pillar reinforcement internal 17 is applied to only portions except for an upper portion of the center pillar 10, that is, middle and lower portions thereof.

An upper end portion of the center pillar reinforcement external 16 is coupled to the roof side rail external 21, and the roof side rail external 21 is coupled to the outside of the roof side rail internal 22 to form the roof side rail 20.

A structure in which the center pillar 10 is fastened to the roof side of the vehicle will be referred to as follows.

A connection member 15 and a reinforcement plate 14 may be applied to a portion where the center pillar 10 is fastened to the roof side of the vehicle.

First, describing the connection member 15, as shown in FIG. 7, FIG. 8, FIG. 9, FIG. 10, and FIG. 11, the center pillar internal upper 12 is applied to a portion where the center pillar internal upper 12 is coupled to the roof side rail internal 22 and coupled to an internal surface of the roof side rail internal 22.

The connection member 15 is formed from an upper end portion of the center pillar internal upper 12 toward a roof panel of the vehicle, and formed to have a cross section in which an unevenness is repeated in the longitudinal direction T of the vehicle. Because the connection member 15 is formed from the upper end portion of the center pillar internal upper 12 toward the roof panel of the vehicle, the connection member 15 may be fastened to each of the roof side rail internal 22 and the roof panel. As the cross section has the shape in which the unevenness is repeated, a sufficient stiffness may be embodied at the coupled portion. The connection member 15 is additionally coupled to the internal side of the vehicle at a portion where the center pillar internal upper 12 is coupled to the roof side rail internal 22, so that it is possible to increase the stiffness of the portion where the center pillar internal upper 12 is connected to the roof side rail internal 22.

Figure 8:
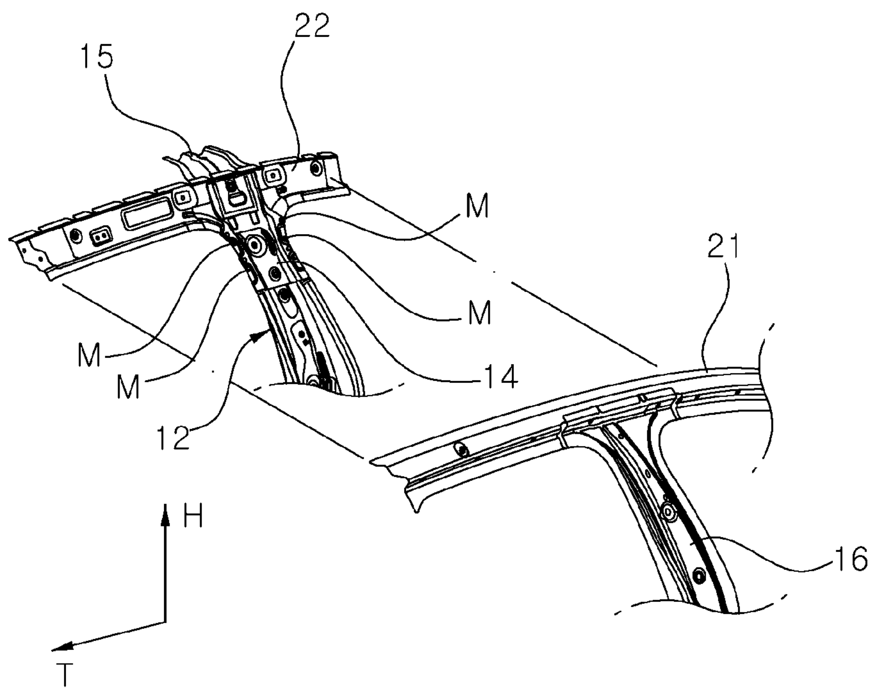
FIG. 8 is a perspective view showing that an upper portion of the center pillar for the vehicle with improved stiffness according to an exemplary embodiment of the present disclosure is coupled to a roof side thereof.

The reinforcement plate 14 is coupled to the external surfaces of the center pillar internal upper 12 and the roof side rail internal 22. The reinforcement plate 14 is formed downward by a predetermined length from an upper end portion of the roof side rail internal 22, and both end portions of the reinforcement plate 14 are coupled to the coupling portion 12*b* formed on the circumference of the center pillar internal upper 12 (see FIGS. 8, 9, and 11). The reinforcement plate 14 is additionally coupled to the external side of the vehicle at the portion where the center pillar internal upper 12 is coupled to the roof side rail internal 22, so that it is possible to increase the stiffness of the portion where the center pillar internal upper 12 is coupled to the roof side rail internal 22. In the reinforcement plate 14, as shown in FIG. 8, a circumference of the reinforcement plate 14 is coupled to the coupling portion 12*b* of the center pillar internal upper 12 by a bolting M. FIG. 8 shows that only the reinforcement plate 14 and the center pillar internal upper 12 are coupled, but the reinforcement plate 14, the center pillar internal upper 12, and the center pillar reinforcement external 16 are coupled by the bolting M in an overlapping state.

Figure 11:
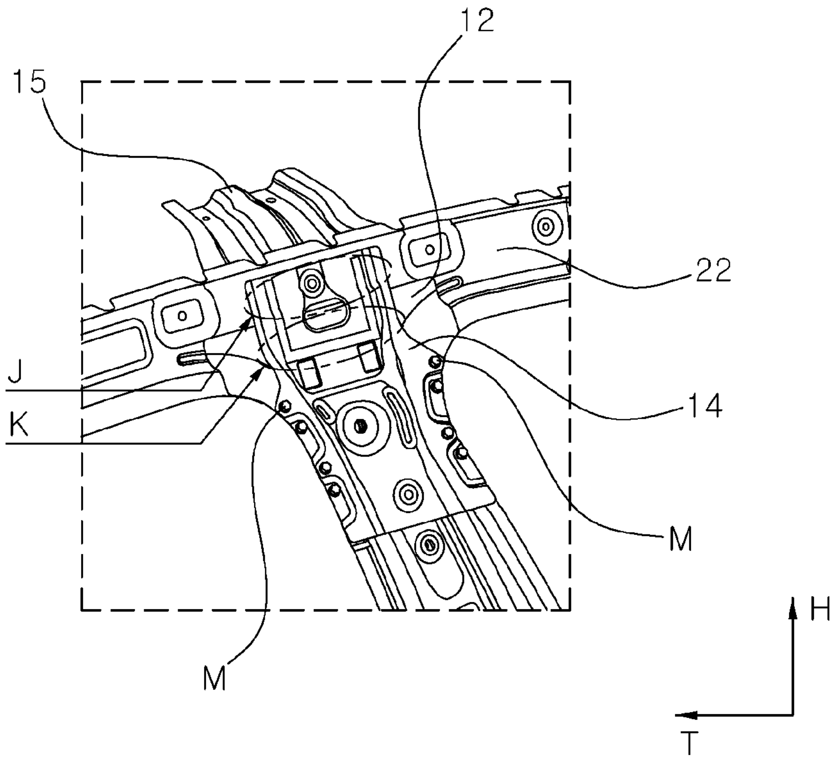
FIG. 11 is an enlarged perspective view showing portion C in FIG. 10.

As shown in FIG. 11, the connection member 15, the roof side rail internal 22, and the reinforcement plate 14 are sequentially disposed and coupled to one another in the width direction L of the vehicle at an upper portion (portion indicated by J) of the roof side rail internal 22.

Meanwhile, the connection member 15, the roof side rail internal 22, the center pillar internal upper 12, and the reinforcement plate 14 are sequentially disposed and coupled to one another at a lower portion (portion indicated by K) of the roof side rail internal 22. The upper end portion of the center pillar internal upper 12 and the upper portion of the center pillar internal upper 12 are coupled to the roof side rail internal 22 at the lower portion of the roof side rail internal 22. At the instant time, the connection member 15 is positioned inside the roof side rail internal 22, and the reinforcement plate 14 is positioned outside the center pillar internal upper 12 to be integrally coupled to each other.

Here, the above components are coupled to each other by bolts, welding, or adhesives.

Furthermore, the belt support 18 fastened to the center pillar 10 also improves the stiffness of the center pillar 10 (see FIG. 12). The belt support 18 is formed in the height direction H of the vehicle to have each of the upper and lower end portions fastened to the belt support fastening portion 12*c* of the center pillar internal upper 12. A bracket 18*a* for fastening the seat belt is formed on the belt support 18. Because the belt support 18 is also a structure formed in the height direction of the vehicle, it is possible to improve the stiffness of the center pillar 10 by fastening the belt support 18 to the center pillar internal upper 12. The belt support 18 may be fastened to the center pillar internal upper 12 using a fastening member such as a fastening bolt 19 at a plurality of points from the upper end portion to the lower end portion of the belt support 18 (portion indicated by F in FIG. 14). FIG. 12 shows an example in which the belt support 18 is fastened to the center pillar internal upper 12 by the fastening bolt 19 at the upper and lower end portions (portions indicated by G) thereof. Furthermore, the upper end portion of the belt support 18 is also fastened to the reinforcement plate 14, so that the stiffness of the corresponding portion is reinforced.

Figure 13:
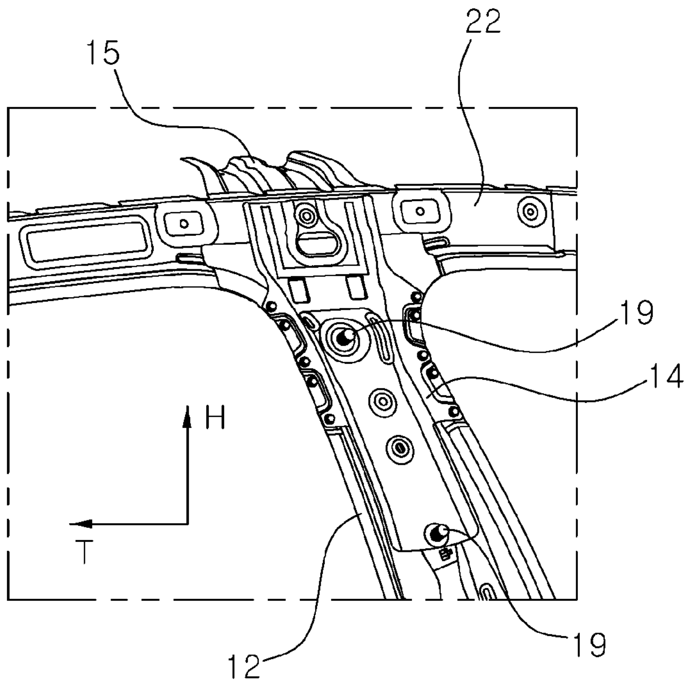
FIG. 13 is a perspective view showing an upper portion of a center pillar for a vehicle with improved stiffness according to another exemplary embodiment of the present disclosure.
Figure 14:
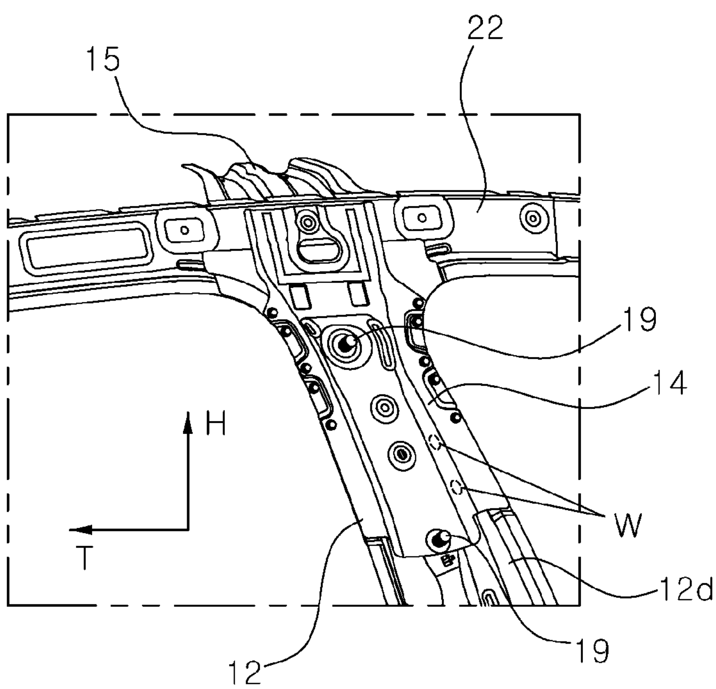
FIG. 14 is a perspective view showing an upper portion of a center pillar for a vehicle with improved stiffness according to various exemplary embodiments of the present disclosure.

FIG. 13 and FIG. 14 each show a modified embodiment of the reinforcement plate 14.

FIG. 13 shows an example in which the lower end portion of the reinforcement plate 14 extends downward. In other words, the lower end portion of the reinforcement plate 14 extends up to the lower end portion of the belt support 18. Accordingly, the belt support 18, the center pillar internal upper 12, the center pillar reinforcement external 16, and the reinforcement plate 14 are fastened by the fastening bolt 19 at the lower end portion of the belt support 18.

Furthermore, as shown in FIG. 14, the reinforcement plate 14 may also extend in the longitudinal direction T of the vehicle. The portion extending downwardly from the reinforcement plate 14 also extends in the longitudinal direction T of the vehicle, and the extending portion of the reinforcement plate 14 is coupled to the internal surface of the center pillar internal upper 12. The portion extending from the reinforcement plate 14 may be coupled to the center pillar internal upper 12 by welding W.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

Furthermore, the term of “fixedly connected” signifies that fixedly connected members always rotate at a same speed. Furthermore, the term of “selectively connectable” signifies “selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member”.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A center pillar for a vehicle with improved stiffness, the center pillar comprising:

a center pillar internal including:

a center pillar internal upper including an upper portion coupled to a roof side rail internal; and a center pillar internal lower including an upper portion coupled to a lower portion of the center pillar internal upper, and a lower portion coupled to a side sill, wherein a center pillar reinforcement internal is coupled to an external surface of the center pillar internal, wherein a center pillar reinforcement external is coupled to an external surface of the center pillar reinforcement internal, wherein the center pillar internal upper is further provided with a connection member and a reinforcement plate at a portion coupled to the roof side rail internal, wherein the connection member is coupled to an internal surface of the roof side rail internal, and wherein the reinforcement plate is coupled to external surfaces of the center pillar internal upper and the roof side rail internal.

2. The center pillar of claim 1, wherein the lower portion of the center pillar internal upper and the upper portion of the center pillar internal lower are disposed to overlap by a predetermined length and coupled to each other.

3. The center pillar of claim 1, wherein the center pillar internal upper includes a material having a tensile strength greater than a tensile strength of the center pillar internal lower.

4. The center pillar of claim 1, wherein the center pillar internal upper further includes:

a coupling portion formed along a periphery of the center pillar internal upper;

stiffness portions formed convexly toward a vehicle interior inside the coupling portion in a height direction of the vehicle, and formed to be spaced from each other in a longitudinal direction of the vehicle;

a connection portion formed to connect the coupling portion and the stiffness portions; and a belt support fastening portion formed between the stiffness portions spaced from each other in the height direction of the vehicle.

5. The center pillar of claim 4, wherein a width of the connection portion is formed to be reduced toward an upper end portion and a lower end portion of the connection portion.

6. The center pillar of claim 4, wherein the center pillar internal lower further includes:

a coupling portion formed along a periphery of the center pillar internal lower; and stiffness portions formed convexly toward the vehicle interior inside the coupling portion in the height direction of the vehicle, and formed to be spaced from each other in the longitudinal direction of the vehicle.

7. The center pillar of claim 6, wherein the stiffness portions of the center pillar internal lower and the stiffness portions of the center pillar internal upper are connected to each other.

8. The center pillar of claim 4, further including: a belt support formed in the height direction of the vehicle, and including each of upper and lower end portions thereof fastened to the belt support fastening portion.

9. The center pillar of claim 1, wherein the connection member is formed from an upper end portion of the center pillar internal upper toward a roof panel of the vehicle, and formed to have a cross section in which an unevenness is repeated in a longitudinal direction of the vehicle.

10. The center pillar of claim 1, wherein the reinforcement plate is formed downwardly from an upper end portion of the roof side rail internal by a predetermined length, and wherein first and second end portions of the reinforcement plate are coupled to a coupling portion formed on a periphery of the center pillar internal upper.

11. The center pillar of claim 10, wherein in the reinforcement plate, an upper portion of the reinforcement plate is coupled to the connection member and the roof side rail internal.

12. The center pillar of claim 10, wherein an upper end portion of the center pillar internal upper is coupled to the connection member, the roof side rail internal, and the reinforcement plate.

13. The center pillar of claim 12, wherein in the center pillar internal upper, the upper portion of the center pillar internal upper is coupled to the roof side rail internal and the reinforcement plate at a portion spaced apart downwardly from the upper end portion of the center pillar internal upper.

14. The center pillar of claim 1, wherein the reinforcement plate is fastened to the center pillar internal upper and an upper end portion of a belt support fastened to the center pillar internal upper in a height direction of the vehicle.

15. The center pillar of claim 1, wherein the reinforcement plate is fastened to a lower end portion of a belt support fastened to the center pillar internal upper in a height direction of the vehicle.

16. The center pillar of claim 1, wherein the reinforcement plate extends in front and rear directions of the vehicle and is coupled to an internal surface of the center pillar internal upper.

17. The center pillar of claim 1, wherein a cross-sectional area of the center pillar internal upper is formed to be narrower upwards.

18. The center pillar of claim 1, wherein a portion where the lower portion of the center pillar internal upper and the upper portion of the center pillar internal lower are coupled is positioned lower than a belt line of the vehicle.

19. The center pillar of claim 1, wherein in the center pillar reinforcement internal, an upper end portion of the center pillar reinforcement internal is positioned higher than an upper end portion of the center pillar internal lower, and positioned lower than a lower end portion of a belt support fastened to the center pillar internal upper in a height direction of the vehicle.

* * * * *